US011574280B1

(12) United States Patent
Wier

(10) Patent No.: US 11,574,280 B1
(45) Date of Patent: *Feb. 7, 2023

(54) CONCATENATED SHIPPING DOCUMENTATION PROCESSING SPAWNING INTELLIGENT GENERATION SUBPROCESSES

(71) Applicant: Auctane, LLC, Austin, TX (US)

(72) Inventor: Byron J. Wier, Austin, TX (US)

(73) Assignee: Auctane, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,618

(22) Filed: Mar. 4, 2022

Related U.S. Application Data

(63) Continuation of application No. 16/691,143, filed on Nov. 21, 2019, now Pat. No. 11,282,025, which is a
(Continued)

(51) Int. Cl.
- G06Q 10/08 (2012.01)
- G06Q 40/00 (2012.01)
- G06Q 30/00 (2012.01)

(52) U.S. Cl.
CPC ....... *G06Q 10/083* (2013.01); *G06Q 10/0835* (2013.01); *G06Q 30/0185* (2013.01); *G06Q 40/12* (2013.12)

(58) Field of Classification Search
CPC .. G06Q 10/083; G06Q 10/0835; G06Q 40/12; G06Q 30/0185
See application file for complete search history.

(56) References Cited

U.S. PATENT DOCUMENTS

| 3,584,696 A | 6/1971 | Eblowitz |
| 3,594,727 A | 7/1971 | Braun |

(Continued)

FOREIGN PATENT DOCUMENTS

| CA | 2470371 A1 | 5/2003 |
| EP | 0137737 A2 | 4/1985 |

(Continued)

OTHER PUBLICATIONS

S. Suh, P. Lukowicz and Y. O. Lee, "Fusion of Global-Local Features for Image Quality Inspection of Shipping Label," 2020 25th International Conference on Pattern Recognition (ICPR), 2021, pp. 2643-2649. (Year: 2021).*

(Continued)

*Primary Examiner* — Asfand M Sheikh
(74) *Attorney, Agent, or Firm* — Norton Rose Fulbright US LLP

(57) ABSTRACT

Systems and methods which provide shipping management system shipping documentation generation operation which spawns intelligent generation subprocesses are described. The intelligent generation subprocesses of embodiments facilitate autonomous shipping documentation generation functionality of a concatenated shipping documentation generation process. A user may initiate a shipping documentation generation process, whereby an intelligent generation subprocess is spawned, and thereafter the user may be freed to perform one or more independent operation and/or interaction with the shipping management system. One or more verifications, checks, warnings, and/or the like are suspended and one or more parameter, input, selection, and/or the like are defaulted for operation of an intelligent generation subprocess of embodiments. Embodiments implement a documentation queue to provide historical information with respect to intelligent generation subprocess operation.

20 Claims, 6 Drawing Sheets

Related U.S. Application Data continuation of application No. 15/064,218, filed on Mar. 8, 2016, now Pat. No. 10,521,754.

(56) References Cited

U.S. PATENT DOCUMENTS

| | | |
|---|---|---|
| 3,691,726 A | 9/1972 | Stephens et al. |
| 4,119,194 A | 10/1978 | Freeman et al. |
| 4,253,158 A | 2/1981 | McFiggans |
| 4,376,299 A | 3/1983 | Rivest |
| 4,511,793 A | 4/1985 | Racanelli |
| 4,641,347 A | 2/1987 | Clark et al. |
| 4,725,718 A | 2/1988 | Sansone et al. |
| 4,743,747 A | 5/1988 | Fougere et al. |
| 4,744,554 A | 5/1988 | Kulpa et al. |
| 4,757,537 A | 7/1988 | Edelmann et al. |
| 4,763,271 A | 8/1988 | Field |
| 4,775,246 A | 10/1988 | Edelmann et al. |
| 4,800,506 A | 1/1989 | Axelrod et al. |
| 4,802,218 A | 1/1989 | Wright et al. |
| 4,807,139 A | 2/1989 | Liechti |
| 4,812,994 A | 3/1989 | Taylor et al. |
| 4,831,554 A | 5/1989 | Storace et al. |
| 4,831,555 A | 5/1989 | Sansone et al. |
| 4,837,701 A | 6/1989 | Sansone et al. |
| 4,858,138 A | 8/1989 | Talmadge |
| 4,864,618 A | 9/1989 | Wright et al. |
| 4,868,757 A | 9/1989 | Gil |
| 4,873,645 A | 10/1989 | Hunter et al. |
| 4,893,249 A | 1/1990 | Silverberg |
| 4,900,903 A | 2/1990 | Wright et al. |
| 4,900,904 A | 2/1990 | Wright et al. |
| 4,900,941 A | 2/1990 | Barton et al. |
| 4,901,241 A | 2/1990 | Schneck |
| 4,908,770 A | 3/1990 | Breault et al. |
| 4,941,091 A | 7/1990 | Breault et al. |
| 5,010,485 A | 4/1991 | Bigari |
| 5,058,008 A | 10/1991 | Schumacher |
| 5,065,000 A | 11/1991 | Pusic et al. |
| 5,067,088 A | 11/1991 | Schneiderhan |
| 5,075,862 A | 12/1991 | Doeberl et al. |
| 5,077,792 A | 12/1991 | Herring |
| 5,085,470 A | 2/1992 | Peach et al. |
| 5,111,030 A | 5/1992 | Brasington et al. |
| 5,150,407 A | 9/1992 | Chan |
| 5,202,834 A | 4/1993 | Gilham |
| 5,222,018 A | 6/1993 | Sharpe et al. |
| 5,233,657 A | 8/1993 | Gunther |
| 5,237,506 A | 8/1993 | Horbal et al. |
| 5,239,168 A | 8/1993 | Durst, Jr. et al. |
| 5,289,540 A | 2/1994 | Jones |
| 5,319,562 A | 6/1994 | Whitehouse |
| 5,323,323 A | 6/1994 | Gilham |
| 5,323,465 A | 6/1994 | Avarne |
| 5,341,505 A | 8/1994 | Whitehouse |
| 5,423,573 A | 6/1995 | de Passille |
| 5,454,038 A | 9/1995 | Cordery et al. |
| 5,483,445 A | 1/1996 | Pickering |
| 5,485,369 A | 1/1996 | Nicholls et al. |
| 5,490,077 A | 2/1996 | Freytag |
| 5,510,992 A | 4/1996 | Kara |
| 5,583,779 A | 12/1996 | Naclerio et al. |
| 5,602,743 A | 2/1997 | Freytag |
| 5,606,507 A | 2/1997 | Kara |
| 5,606,613 A | 2/1997 | Lee et al. |
| 5,612,541 A | 3/1997 | Hoffmann et al. |
| 5,612,889 A | 3/1997 | Pintsov et al. |
| 5,619,571 A | 4/1997 | Sandstrom et al. |
| 5,623,546 A | 4/1997 | Hardy et al. |
| 5,649,118 A | 7/1997 | Carlisle et al. |
| 5,655,023 A | 8/1997 | Cordery et al. |
| 5,663,547 A | 9/1997 | Ziarno |
| 5,696,829 A | 12/1997 | Cordery et al. |
| 5,706,502 A | 1/1998 | Foley et al. |
| 5,708,422 A | 1/1998 | Blonder et al. |
| 5,715,314 A | 2/1998 | Payne et al. |
| 5,717,596 A | 2/1998 | Bernard et al. |
| 5,717,597 A | 2/1998 | Kara |
| 5,729,459 A | 3/1998 | Brandien et al. |
| 5,729,460 A | 3/1998 | Plett et al. |
| 5,729,674 A | 3/1998 | Rosewarne et al. |
| 5,742,683 A | 4/1998 | Lee et al. |
| 5,768,132 A | 6/1998 | Cordery et al. |
| 5,774,886 A | 6/1998 | Kara |
| 5,778,076 A | 7/1998 | Kara et al. |
| 5,796,834 A | 8/1998 | Whitney et al. |
| 5,801,364 A | 9/1998 | Kara et al. |
| 5,801,944 A | 9/1998 | Kara |
| 5,812,991 A | 9/1998 | Kara |
| 5,819,240 A | 10/1998 | Kara |
| 5,822,739 A | 10/1998 | Kara |
| 5,825,893 A | 10/1998 | Kara |
| 5,860,068 A | 1/1999 | Cook |
| 5,923,885 A | 7/1999 | Johnson et al. |
| 5,936,885 A | 8/1999 | Morita et al. |
| 5,946,671 A | 8/1999 | Herring |
| 5,960,418 A | 9/1999 | Kelly et al. |
| 5,983,209 A | 11/1999 | Kara |
| 6,005,945 A | 12/1999 | Whitehouse |
| 6,010,069 A | 1/2000 | Debois |
| 6,047,273 A | 4/2000 | Vaghi |
| 6,061,670 A | 5/2000 | Brand |
| 6,061,671 A | 5/2000 | Baker et al. |
| 6,175,825 B1 | 1/2001 | Fruechtel |
| 6,199,055 B1 | 3/2001 | Kara et al. |
| 6,208,980 B1 | 3/2001 | Kara |
| 6,233,565 B1 | 5/2001 | Lewis et al. |
| 6,233,568 B1 | 5/2001 | Kara |
| 6,249,777 B1 | 6/2001 | Kara et al. |
| 6,381,590 B1 | 4/2002 | Debois |
| 6,385,504 B1 | 5/2002 | Pintsov et al. |
| 6,385,731 B2 | 5/2002 | Ananda |
| 6,424,954 B1 | 7/2002 | Leon |
| 6,430,543 B1 | 8/2002 | Lee et al. |
| 6,470,327 B1 | 10/2002 | Carroll et al. |
| 6,526,393 B1 | 2/2003 | Fredman |
| 6,532,452 B1 | 3/2003 | Pintsov et al. |
| 6,834,273 B1 | 12/2004 | Sansone et al. |
| 6,853,990 B1 | 2/2005 | Thiel |
| 6,865,557 B1 | 3/2005 | Cordery et al. |
| 6,889,214 B1 | 5/2005 | Pagel et al. |
| 7,149,726 B1 | 12/2006 | Lingle et al. |
| 7,177,825 B1 | 2/2007 | Borders et al. |
| 7,182,259 B2 | 2/2007 | Lubow et al. |
| 7,225,170 B1 | 5/2007 | Ryan, Jr. |
| 7,233,929 B1 | 6/2007 | Lingle et al. |
| 7,243,842 B1 | 7/2007 | Leon et al. |
| 7,266,531 B2 | 9/2007 | Pintsov et al. |
| 7,337,152 B1 | 2/2008 | Gawler |
| 7,343,357 B1 | 3/2008 | Kara |
| 7,383,194 B2 | 6/2008 | Heiden et al. |
| 7,409,353 B1 | 8/2008 | Uslontsev et al. |
| 7,430,424 B2 | 9/2008 | Kraft et al. |
| 7,444,290 B2 | 10/2008 | Woods et al. |
| 7,458,612 B1 | 12/2008 | Bennett |
| 7,509,291 B2 | 3/2009 | McBride et al. |
| 7,548,612 B2 | 6/2009 | Weissman et al. |
| 7,660,721 B2 | 2/2010 | Williams et al. |
| 7,711,650 B1 | 5/2010 | Kara |
| 7,756,796 B2 | 7/2010 | Bodie et al. |
| 7,778,924 B1 | 8/2010 | Ananda |
| 7,784,090 B2 | 8/2010 | Lord et al. |
| 7,827,118 B1 | 11/2010 | Smith, III et al. |
| 7,831,518 B2 | 11/2010 | Montgomery et al. |
| 7,831,824 B2 | 11/2010 | Abdulhayoglu |
| 7,840,492 B2 | 11/2010 | Leung et al. |
| 7,882,042 B2 | 2/2011 | Meyer et al. |
| 7,954,709 B1 | 6/2011 | Leon et al. |
| 7,963,437 B1 | 6/2011 | McBride et al. |
| 8,005,762 B2 | 8/2011 | Ogg et al. |
| 8,027,927 B2 | 9/2011 | Ogg et al. |
| 8,027,935 B1 | 9/2011 | Begen |
| 8,041,644 B2 | 10/2011 | Ogg et al. |
| 8,046,823 B1 | 10/2011 | Begen et al. |
| 8,100,324 B1 | 1/2012 | Leon |

(56) References Cited

U.S. PATENT DOCUMENTS

| | | |
|---|---|---|
| 8,204,835 B1 | 6/2012 | Ogg |
| 8,240,579 B1 | 8/2012 | Bennett |
| 8,255,337 B1 | 8/2012 | Bennett et al. |
| 8,600,910 B2 | 12/2013 | Kara et al. |
| 8,600,913 B2 | 12/2013 | Williams et al. |
| 8,612,361 B1 | 12/2013 | Bussell et al. |
| 8,626,673 B1 | 1/2014 | Bennett |
| 8,775,331 B1 | 7/2014 | Tsuie et al. |
| 8,868,472 B1 | 10/2014 | Lin et al. |
| 9,082,234 B1 | 7/2015 | Clem |
| 9,208,620 B1 | 12/2015 | Bortnak et al. |
| 9,230,233 B1 | 1/2016 | Sundaresan et al. |
| 9,761,061 B1 | 9/2017 | Bussell et al. |
| 9,824,380 B1 | 11/2017 | Chowdhary et al. |
| 9,842,308 B1 | 12/2017 | Biswas et al. |
| 9,922,302 B2 | 3/2018 | Gventer et al. |
| 10,417,728 B1 | 9/2019 | Yoggi et al. |
| 2001/0007086 A1 | 7/2001 | Rogers et al. |
| 2001/0020234 A1 | 9/2001 | Shah et al. |
| 2001/0022060 A1 | 9/2001 | Robertson et al. |
| 2001/0042052 A1 | 11/2001 | Leon |
| 2002/0032573 A1 | 3/2002 | Williams et al. |
| 2002/0032668 A1 | 3/2002 | Kohler et al. |
| 2002/0032784 A1 | 3/2002 | Darago et al. |
| 2002/0052841 A1 | 5/2002 | Guthrie et al. |
| 2002/0065577 A1 | 5/2002 | Teraura et al. |
| 2002/0073050 A1 | 6/2002 | Gusler et al. |
| 2002/0082935 A1 | 6/2002 | Moore et al. |
| 2002/0095347 A1 | 7/2002 | Cummiskey |
| 2002/0099652 A1 | 7/2002 | Herzen et al. |
| 2002/0116318 A1 | 8/2002 | Thomas et al. |
| 2002/0143431 A1 | 10/2002 | Sansone |
| 2003/0009425 A1 | 1/2003 | Stonedahl et al. |
| 2003/0029914 A1 | 2/2003 | Hortman et al. |
| 2003/0037008 A1 | 2/2003 | Raju et al. |
| 2003/0050819 A1 | 3/2003 | Koenigbauer et al. |
| 2003/0065739 A1 | 4/2003 | Shnier |
| 2003/0080182 A1 | 5/2003 | Gunther |
| 2003/0088473 A1 | 5/2003 | Fisher et al. |
| 2003/0089765 A1 | 5/2003 | Kovlakas |
| 2003/0101143 A1 | 5/2003 | Montgomery et al. |
| 2003/0101147 A1 | 5/2003 | Montgomery et al. |
| 2003/0101148 A1 | 5/2003 | Montgomery et al. |
| 2003/0130963 A1 | 7/2003 | Stickler et al. |
| 2003/0138345 A1 | 7/2003 | Schwabe |
| 2003/0167241 A1 | 9/2003 | Gilham |
| 2003/0182155 A1 | 9/2003 | Nitzan et al. |
| 2003/0187666 A1 | 10/2003 | Leon |
| 2003/0204477 A1 | 10/2003 | McNett |
| 2003/0217018 A1 | 11/2003 | Groff et al. |
| 2003/0233276 A1 | 12/2003 | Pearlman et al. |
| 2003/0236709 A1 | 12/2003 | Hendra et al. |
| 2004/0002926 A1 | 1/2004 | Coffy et al. |
| 2004/0044586 A1 | 3/2004 | Gullo et al. |
| 2004/0048503 A1 | 3/2004 | Mills et al. |
| 2004/0064422 A1 | 4/2004 | Leon |
| 2004/0083179 A1 | 4/2004 | Sesek et al. |
| 2004/0083189 A1 | 4/2004 | Leon |
| 2004/0089482 A1 | 5/2004 | Ramsden et al. |
| 2004/0122776 A1 | 6/2004 | Sansone |
| 2004/0122779 A1 | 6/2004 | Stickler et al. |
| 2004/0128264 A1 | 7/2004 | Leung et al. |
| 2004/0185827 A1 | 9/2004 | Parks |
| 2004/0185882 A1 | 9/2004 | Gecht et al. |
| 2004/0186811 A1 | 9/2004 | Gullo et al. |
| 2004/0212833 A1 | 10/2004 | Taskett et al. |
| 2004/0215581 A1 | 10/2004 | Lord et al. |
| 2004/0215583 A1 | 10/2004 | Elliott |
| 2004/0230544 A1 | 11/2004 | Herbert |
| 2004/0254808 A1 | 12/2004 | Bennett et al. |
| 2005/0060165 A1 | 3/2005 | Knight et al. |
| 2005/0065892 A1 | 3/2005 | Ryan et al. |
| 2005/0065896 A1 | 3/2005 | Kummer et al. |
| 2005/0065897 A1 | 3/2005 | Ryan et al. |
| 2005/0071244 A1 | 3/2005 | Phillips et al. |
| 2005/0080751 A1 | 4/2005 | Burningham |
| 2005/0114222 A1 | 5/2005 | Mundy |
| 2005/0116047 A1 | 6/2005 | Lu et al. |
| 2005/0119786 A1 | 6/2005 | Kadaba |
| 2005/0171791 A1 | 8/2005 | Chimenti et al. |
| 2005/0171869 A1 | 8/2005 | Minnocci |
| 2005/0192899 A1 | 9/2005 | Reardon |
| 2005/0237203 A1 | 10/2005 | Burman et al. |
| 2005/0256811 A1 | 11/2005 | Pagel et al. |
| 2005/0278266 A1 | 12/2005 | Ogg et al. |
| 2006/0000648 A1 | 1/2006 | Galtier |
| 2006/0020505 A1 | 1/2006 | Whitehouse |
| 2006/0122947 A1 | 6/2006 | Poulin |
| 2006/0173700 A1 | 8/2006 | Fenelon |
| 2006/0173796 A1 | 8/2006 | Kara |
| 2006/0173799 A1 | 8/2006 | Minnocci |
| 2006/0213979 A1 | 9/2006 | Geller et al. |
| 2006/0213980 A1 | 9/2006 | Geller et al. |
| 2006/0220298 A1 | 10/2006 | Fairweather et al. |
| 2006/0224462 A1 | 10/2006 | Brezenoff |
| 2006/0229895 A1 | 10/2006 | Kodger |
| 2006/0259390 A1 | 11/2006 | Rosenberger |
| 2006/0282271 A1 | 12/2006 | Ananda et al. |
| 2006/0283943 A1 | 12/2006 | Ostrowski et al. |
| 2007/0011187 A1 | 1/2007 | Chitgupakar et al. |
| 2007/0033110 A1 | 2/2007 | Philipp et al. |
| 2007/0073551 A1 | 3/2007 | Williams et al. |
| 2007/0073587 A1 | 3/2007 | Walker et al. |
| 2007/0078795 A1 | 4/2007 | Chatte |
| 2007/0080228 A1 | 4/2007 | Knowles et al. |
| 2007/0174213 A1 | 7/2007 | Whitehouse et al. |
| 2007/0174215 A1 | 7/2007 | Morel |
| 2007/0198977 A1 | 8/2007 | Abernethy et al. |
| 2007/0255664 A1 | 11/2007 | Blumberg et al. |
| 2008/0103968 A1 | 5/2008 | Bies et al. |
| 2008/0133659 A1 | 6/2008 | Aldrey et al. |
| 2008/0154781 A1 | 6/2008 | Kumar |
| 2008/0169343 A1* | 7/2008 | Skaaksrud ............ G06Q 10/08 235/376 |
| 2008/0281719 A1 | 11/2008 | Hall et al. |
| 2009/0146410 A1 | 6/2009 | Uslontsev et al. |
| 2009/0164392 A1 | 6/2009 | Raju et al. |
| 2009/0172084 A1 | 7/2009 | Lavanya et al. |
| 2009/0172126 A1 | 7/2009 | Brennan et al. |
| 2009/0259513 A1* | 10/2009 | Tung ................ G06Q 10/0633 705/28 |
| 2009/0265585 A1 | 10/2009 | Ikegami |
| 2010/0076903 A1 | 3/2010 | Klingenberg et al. |
| 2010/0169241 A1 | 7/2010 | Schoonmaker et al. |
| 2010/0179892 A1 | 7/2010 | O'Brien et al. |
| 2010/0235267 A1 | 9/2010 | Brookner et al. |
| 2010/0298662 A1 | 11/2010 | Yu et al. |
| 2010/0312627 A1 | 12/2010 | Khechef et al. |
| 2010/0323722 A1 | 12/2010 | Hatami |
| 2011/0015935 A1 | 1/2011 | Montgomery et al. |
| 2011/0022544 A1 | 1/2011 | Kim et al. |
| 2011/0029429 A1 | 2/2011 | Whitehouse |
| 2011/0071944 A1 | 3/2011 | Heiden et al. |
| 2011/0145107 A1 | 6/2011 | Greco |
| 2011/0173144 A1 | 7/2011 | Shan et al. |
| 2011/0225180 A1 | 9/2011 | Liao et al. |
| 2011/0231334 A1 | 9/2011 | Jindel |
| 2011/0242554 A1 | 10/2011 | Farry et al. |
| 2011/0295646 A1 | 12/2011 | Barros |
| 2011/0317158 A1 | 12/2011 | Lyng et al. |
| 2012/0008766 A1 | 1/2012 | Robertson et al. |
| 2012/0054754 A1 | 3/2012 | Teichmann et al. |
| 2012/0084090 A1 | 4/2012 | Woodard et al. |
| 2012/0109777 A1 | 5/2012 | Lipsitz et al. |
| 2012/0159603 A1 | 6/2012 | Queck |
| 2012/0216133 A1 | 8/2012 | Barker et al. |
| 2012/0233252 A1 | 9/2012 | Vats et al. |
| 2012/0240204 A1 | 9/2012 | Bhatnagar et al. |
| 2012/0265676 A1 | 10/2012 | Gould et al. |
| 2013/0056533 A1 | 3/2013 | Zimberoff et al. |
| 2013/0061337 A1 | 3/2013 | Zimberoff et al. |
| 2013/0066794 A1 | 3/2013 | Hill et al. |
| 2013/0144763 A1 | 6/2013 | Skyberg et al. |
| 2013/0179361 A1 | 7/2013 | Williams et al. |

(56) References Cited

U.S. PATENT DOCUMENTS

| | | | |
|---|---|---|---|
| 2013/0254132 | A1 | 9/2013 | Srinath et al. |
| 2013/0346249 | A1 | 12/2013 | Li |
| 2014/0019517 | A1 | 1/2014 | Fawcett |
| 2014/0067665 | A1 | 3/2014 | Paletz et al. |
| 2014/0149308 | A1 | 5/2014 | Ming |
| 2014/0208325 | A1 | 7/2014 | Chen et al. |
| 2014/0265300 | A1 | 9/2014 | Jena |
| 2014/0278099 | A1 | 9/2014 | Schenken |
| 2014/0324633 | A1 | 10/2014 | Pollak et al. |
| 2015/0046361 | A1 | 2/2015 | Williams et al. |
| 2016/0196527 | A1 | 7/2016 | Bose et al. |
| 2021/0081890 | A1* | 3/2021 | Atwood ............ G06Q 10/0833 |

FOREIGN PATENT DOCUMENTS

| | | |
|---|---|---|
| EP | 0571259 A1 | 11/1993 |
| EP | 0927958 A2 | 7/1999 |
| EP | 0927963 A2 | 7/1999 |
| EP | 1785856 A2 | 5/2007 |
| FR | 2580844 A1 | 10/1986 |
| GB | 2251210 A | 7/1992 |
| JP | 04-284558 B2 | 10/1992 |
| JP | 2000-105845 A | 4/2000 |
| WO | WO-88/01818 A1 | 3/1988 |
| WO | WO-97/40472 A1 | 10/1997 |
| WO | WO-98/14907 A2 | 4/1998 |
| WO | WO-98/14909 A2 | 4/1998 |
| WO | WO-98/57302 A1 | 12/1998 |
| WO | WO-98/57460 A1 | 12/1998 |
| WO | WO-02/063517 A2 | 8/2002 |
| WO | WO-02/093498 A2 | 11/2002 |
| WO | WO-03/039051 A2 | 5/2003 |
| WO | WO-03/083784 A1 | 10/2003 |

OTHER PUBLICATIONS

International Search Report and Written Opinion issued for PCT Application No. PCT/US2017/020662, dated May 19, 2017, 14 pages.
Ford, C., "Frequent Flyer Programs," Australian Accountant, 63, 1, Feb. 1993, pp. 52-58, 7 pages.
Alexander, K.L., "U.S. Stamps Pay Tribute to Starry-Eyed Jurors," Final Edition, Calgary Herald, Calgary, Alberta, Canada, Sep. 14, 2007, 2 pages.
Non-Final Office Action dated Aug. 3, 2009 for U.S. Appl. No. 11/353,690 to Kara, filed Feb. 14, 2006, and entitled "System and Method for Validating Postage," 19 pages.
"Domestic Mail Manual Section 604," United States Postal Service, Aug. 31, 2005, 45 pages.
"Mobile Postage stamps via text message announced", http://telecoms.cytalk.com/2011/03/mobile-postage-stamps-via-text-messages-announced/, CY.TALK Telecoms News Blog, Mar. 14, 2011 in Telecoms, Texting, pp. 1-9.
Mobile Postage Stamps Via Text Messages Announced, Phone Reviews, Mobile Phones, News, Mar. 11, 2011, pp. 1-3.
Anonymous, "Automated Indicia Detection System From Parascript Protects Postage Revenue for Postal Operators, Cracks Down on Fraud:—Parascript StampVerify Simplifies Complex Task of Automatically Locating and Verifying Different Types of Indicia on Envelope Images—," PR Newswire, New York, Sep. 18, 2007, 2 pages.
Davies, B. L. "Printing System for Preventing Injustice by Delivering Print Data from Postal Charge Meter to Printer," Jan. 2001, 1 page.
Unpublished U.S. Appl. No. 12/103,496 to Bortnak et al., filed Apr. 15, 2008 and entitled "Systems and Methods for Activation of Postage Indicia at Point of Sale," 40 pages.
Unpublished U.S. Appl. No. 11/509,309 to Leon filed Aug. 24, 2006 and entitled "Invisible Fluorescent Ink Mark," 15 pages.
Unpublished U.S. Appl. No. 12/030,739 to McBride et al. filed Feb. 13, 2008 and entitled "Systems and Methods for Distributed Activation of Postage," 35 pages.
Unpublished U.S. Appl. No. 11/323,463 to Leon et al. filed Dec. 30, 2005 and entitled "Systems and Methods for Single Pass Printing Postage Indicia," 23 pages.
Unpublished U.S. Appl. No. 10/606,579 to Ogg, filed Jun. 26, 2003 and entitled "System and Method for Automatically Processing Mail," 15 pages.
"Endicia Releases Unique Return Shipping Solution," retrieved from http://www.endicia.com/about-us/press-room/20140610, last accessed May 13, 2015, Jun. 10, 2014, 2 pages.
"Return Shipping Labels—Simplify Product Returns Without the Extra Cost of Accounts & Permits," retrieved from http://www.endicia.com/Features/ReturnShippingLabels/, last accessed May 13, 2015, undated, 2 pages.
"Newgistics: Offering Reverse Logistics to Easily Manage Returns," retrieved from http://www.newgistics.com/corp_returns/#newgisticssmartlabelandshipmentmanager, last accessed May 13, 2015, undated, 5 pages.
"E-Commerce Technology—The Most Modular and Scalable E-Commerce Platform that Grows With Your Business," http://www.newgistics.com/corp_ecommerce/index.aspx, last accessed May 13, 2015, undated, 6 pages.
"Returns Made Easy," retrieved from <https://www.usps.com/returns/>, last accessed May 13, 2015, undated, 5 pages.
"Return Services & Options for Parcels," retrieved from https://www.usps.com/business/return-services.htm, last accessed May 13, 2015, undated, 6 pages.
Unpublished U.S. Appl. No. 13/647,001 to Yoggi, filed Oct. 8, 2012 and entitled "Systems and Methods for Providing Shipping Service Guarantees," 44 pages.
Unpublished U.S. Appl. No. 12/316,542 to Leon, filed Dec. 9, 2008 and entitled "Mail Piece Processing," 74 pages.
Unpublished U.S. Appl. No. 13/705,935 to McBride, filed Dec. 5, 2012 and entitled "Visual Graphic Tracking of Item Shipment and Delivery," 62 pages.
Unpublished U.S. Appl. No. 13/828,800 to Atkinson, filed Mar. 14, 2013 and entitled "Systems and Methods for Mail Piece Interception, Rescue Tracking, and Confiscation Alerts and Related Services," 63 pages.
International Search Report issued for PCT/US95/00237, dated May 29, 1995, 4 pages.
Examination Report No. 1 issued for Australian Patent Application No. 2017228918, dated Jun. 28, 2019, 4 pages.
Grabara, J. et al. "The Role of Information Systems in Transport Logistics" International Journal of Education and Research, vol. 2, No. 2, Feb. 2014, 8 pages.
Weigand, H. et al. "Rule-based service composition and service-oriented business rule management." Proceedings of the International Workshop on Regulations Modelling and Deployment (ReMoD'08). Research Group: Information Management, Jun. 2008, 12 pages.
Weigand, H. et al., "Rule-based service composition and service-oriented business rule management." Proceedings of the International Workshop on Regulations Modelling and Deployment (ReMoD'08). Jun. 2008. (Year: 2008).

* cited by examiner

Documentation Queue 304

Print ▾  Mark Printed  Archive

☐ Batch #100074    02/03 4:56PM
   4 Complete
   Label | Packing Slip | Pick List
   Mark as Printed                Archive ☐ Batch #100073    02/03 4:55PM
   2 Complete
   Label | Packing Slip | Pick List
   Mark as Printed                Archive ☐ Order #MTP-9869   02/03 4:55PM
   1 Complete
   Label | Packing Slip | Pick List
   Mark as Printed                Archive ...ders | Shipments | Products | Customers Group ▾ | Categorize ▾ | Deactivate | Import | Export | Combine | New Product Group ▾ | Product Type ▾ | Category ▾ | Created ▾ | Modified Date ▾ | Image URL ▾

1 lable finished

Layout ▾ | Columns

☐ Show Inactive Prod

Preset Group

| | SKU | Alias | Name |
|---|---|---|---|
| 1 | Item - A | | Navy Blue Cutout Flag |

US 11,574,280 B1

CONCATENATED SHIPPING DOCUMENTATION PROCESSING SPAWNING INTELLIGENT GENERATION SUBPROCESSES

CROSS-REFERENCE TO RELATED APPLICATIONS

The present application is a continuation of U.S. patent application Ser. No. 16/691,143 filed Nov. 21, 2019 and entitled "CONCATENATED SHIPPING DOCUMENTATION PROCESSING SPAWNING INTELLIGENT GENERATION SUBPROCESSES," issued Mar. 22, 2022 as U.S. Pat. No. 11,282,025, which is a continuation of U.S. patent application Ser. No. 15/064,218 filed Mar. 8, 2016 and entitled "CONCATENATED SHIPPING DOCUMENTATION PROCESSING SPAWNING INTELLIGENT GENERATION SUBPROCESSES," issued Dec. 31, 2019 as U.S. Pat. No. 10,521,754, which is related to U.S. patent application Ser. No. 14/255,713 filed Apr. 17, 2014 and entitled "SINGLE SECURE ENVIRONMENT SESSION GENERATING MULTIPLE INDICIA," issued Sep. 17, 2019 as U.S. Pat. No. 10,417,728, and 14/753,918 filed Jun. 29, 2015 and entitled "SYSTEMS AND METHODS FOR CLOUD-BASED APPLICATION ACCESS TO RESOURCE," issued Nov. 13, 2018 as U.S. Pat. No. 10,129,172, the disclosures of which are incorporated herein by reference in their entirety.

TECHNICAL FIELD

The invention relates generally to generation of shipping documentation and, more particularly, to shipping documentation processing operation that spawns intelligent generation subprocesses, such as may be used to facilitate autonomous functionality and/or independent operation.

BACKGROUND OF THE INVENTION

The use of various forms of computing equipment to automate or otherwise perform a number of tasks has become widespread. With the proliferation of processor-based platforms, such as personal computers (PCs), tablet devices, smart phones, personal digital assistants (PDAs), and servers, capable of executing instruction sets for providing specialized or generalized functionality, such as word processing, accounting, document generation and management, printing, data communication, and image capture, generation, and management, the use of such computing equipment has become nearly ubiquitous in both business as well as personal settings. One example of functionality that is provided through the use of such computing equipment is the automation of tasks associated with the shipment of items, including the management of item orders, managing the picking and packing of items for order fulfilment, generation of invoices, packing slips, manifests, shipping labels, and postage or other prepaid shipping indicia, and tracking of shipment of items through a shipping service provider. Such automation of item shipment management is provided, for example, by the SHIPSTATION shipping management system provided by Auctane LLC of Austin Tex.

With the advent of the Internet and the advent of innumerable e-commerce merchants, not only have the number of items shipped increased appreciably in recent years, but so too have the number of shippers and recipients of such items. It is commonplace for such merchants, whether they be "brick and mortar" merchants, online merchants, or sellers through an electronic marketplace (e.g., eBay, Amazon Marketplace, etc.), to utilize computing equipment to facilitate their shipping goods using a number of forms of shipping services and media, such as letters, flats, and parcels, via various shipping service providers, such as the United States Postal Service (USPS), United Parcel Service (UPS), Federal Express (FedEx), Dalsey, Hillblom and Lynn (DHL), and local and regional couriers. Accordingly, more and more shippers, including not only large scale business traditionally involved with high volume shipping but also less sophisticated smaller entities tasked with an appreciable number of shipments, are processing relatively large numbers of items for shipment.

Although various shipping management systems have automated many shipping functions, shipping management systems have generally provided for generation of shipping labels in a user interactive process, whereby the user interacts with the user interface throughout completion of generation of each shipping label. For example, a user of a shipping management system may select an order for generation of a shipping label and thereafter be required to step through functions such as verifying the order, selecting and/or confirming shipping parameters (e.g., shipment method, shipping service provider, shipment date, rating information, additional services, etc.), requesting generation of a shipping label, waiting for rate details to be presented, confirming rate details, selecting a shipping label creation option, waiting for a shipping label to be generated, reviewing and/or approving the generated shipping label, and printing or downloading the shipping label for use in shipping the item. In addition to inputting and/or selecting information at a number of these steps in the shipping label generation process, the user may be presented with various warnings and/or queries and be required to address one or more issues with respect to the generation of the shipping label, such as to purchase additional postage value where the shipping label is to include prepaid indicia and sufficient postage value is not otherwise present. The foregoing shipping label generation process is typically essentially captive-atomic, in that it must complete or be aborted before the user is free to perform other functions in the shipping management system, such as to initiate a process for generating a shipping label for another order or to otherwise perform shipping management functions independent of the then current shipping label generation process.

Such captive-atomic processing of shipping label generation functionality, although well suited for shipping management operation with respect to individual orders, can be very tedious and slow when a user is attempting to process a relatively large number of orders and their attendant shipments. For example, where the shipping label is to be generated to include prepaid postage indicia (e.g., postage indicia accepted by the USPS for shipping services), in addition to being presented with postage rate information for verification and acceptance in response to a shipping label generation request (a task which can be somewhat time consuming and quite repetitive in many shipping situations), the user must wait for operation at the postage indicia server to complete the processing required to generate the secure value bearing indium (a process that may require appreciable time in light of the secure vault protocols and cryptographic operations performed). Thus, the duration of the processing to generate a shipping label can be appreciable, and can aggregate in a situation where the user is processing shipping labels for a relatively large number of orders to comprise a substantial amount of time dedicated to shipping label generation. Even where a shipping label does not include value bearing indicium (e.g., shipping labels typically used by such shipping service providers as UPS, FedEx, and DHL), the generation of a number of shipping labels using the captive-atomic processing typically provided may nevertheless require an appreciable amount of time, including appreciable idol user time spent waiting for various operations to complete, dedicated to shipping label generation.

BRIEF SUMMARY OF THE INVENTION

The present invention is directed to systems and methods which provide shipping management system shipping documentation generation operation which spawns intelligent generation subprocesses. The intelligent generation subprocesses of embodiments facilitate autonomous shipping documentation generation functionality of a concatenated shipping documentation generation process. The shipping documentation generated according to embodiments of the invention may, for example, comprise shipping labels used in shipping items for one or more orders placed to a shipper. Such shipping labels may comprise various features, such value bearing postage indicia, machine readable information (e.g., in the form of barcodes, graphic tags, etc.), cryptographic aspects (e.g., digitally signed information), etc., in addition to or in the alternative to more traditional shipping label information, such as origination address, destination address, shipper account information, shipping service information, tracking information, and the like. The shipping documentation generated according to embodiments herein may comprise documentation in addition to or in the alternative to the aforementioned shipping labels, such as manifests, bills of lading, way bills, transmittals, etc. For example, shipping documentation generated by embodiments of the invention comprises shipping labels and supporting documentation, such as packing slips, invoices, product picking instructions, customs forms, etc., for one or more orders.

A user may initiate a shipping documentation generation process, whereby an intelligent generation subprocess is spawned in accordance with the concepts herein, and thereafter the user may be freed to perform one or more independent operation and/or interaction with the shipping management system. For example, embodiments of the invention may perform operations for generating shipping documentation with respect to shipment processing of an order precipitating shipment of an item, while one or more other processes of the shipping management system (e.g., shipping documentation generation processing for another order) are performed in parallel in response to independent user interaction with the shipping management system.

In operation of an intelligent generation subprocess of embodiments, one or more verifications, checks, warnings, and/or the like (collectively referred to as advices) typically implemented in shipping documentation generation processing by the shipping management system are suspended. Further, one or more parameter, input, selection, and/or the like (collectively referred to as configuration factors) typically solicited in shipping documentation generation processing by the shipping management system are defaulted. The intelligent generation subprocess of embodiments operates without presenting the aforementioned advices and using one or more defaulted configuration factors to intelligently and autonomously generate appropriate shipping documentation in the background. The intelligent operation provided by an intelligent generation subprocess of embodiments herein may fail the generation processing where one or more critical issues (e.g., insufficient postage funds, insufficient inventory, incomplete order processing, incompatible defaulted configuration factors, etc.) are detected with respect to shipping documentation generation. Accordingly, intelligent generation subprocesses operable in accordance with concepts herein adroitly control one or more aspect of documentation generation.

In adapting a shipping management system for use of intelligent generation subprocesses, embodiments of the invention implement a documentation queue. The documentation queue of embodiments provides historical information with respect to intelligent generation subprocess operation. For example, a documentation queue may operate to provide a running history of the operation of each active intelligent generation subprocess. Additionally or alternatively, a documentation queue may present the results of intelligent generation subprocess operation for the use of a user. For example, a documentation queue of embodiments may provide information regarding and/or access to successfully generated shipping documentation (e.g., shipping labels, manifests, bills of lading, way bills, transmittals, packing slips, invoices, product picking instructions, customs forms, etc.). Likewise, a documentation queue of embodiments may provide information regarding a failed documentation generation, perhaps providing access to one or more functions for correcting critical issues causing the generation processing to fail. Entries in the documentation queue of embodiments may be removed or otherwise omitted from presentation by the documentation queue, such as by archiving queue entries (e.g., manually and/or automatically), changing a state with respect to the queue entry, etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 3C and 3D show user interfaces having exemplary documentation queue information displayed therein according to embodiments of the invention.

DETAILED DESCRIPTION OF THE INVENTION

Figure 1:
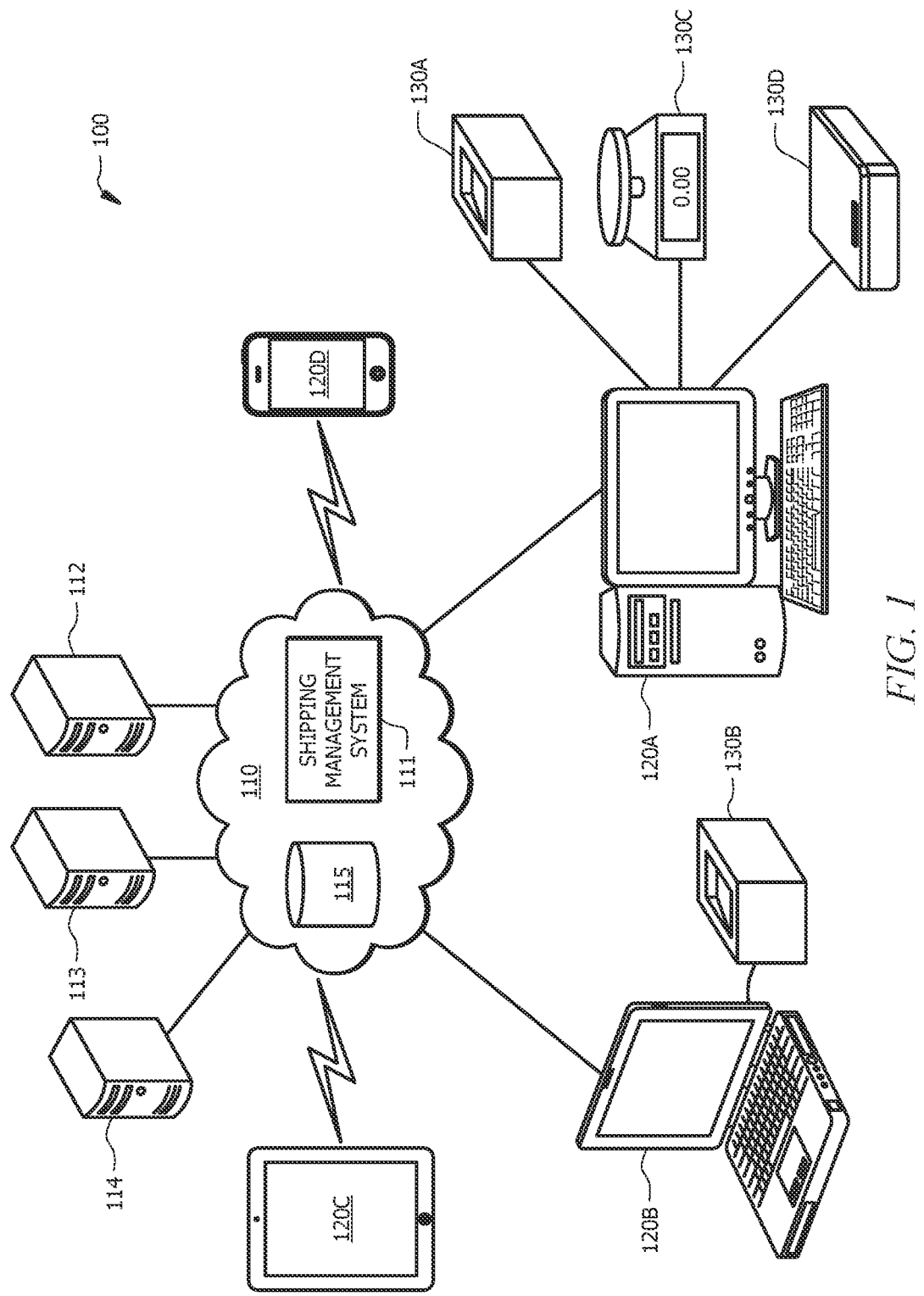
FIG. 1 shows an embodiment of a system adapted to provide concatenated shipping documentation processing spawning intelligent generation subprocesses according to embodiments of the invention.

FIG. 1 shows an embodiment of a system (system 100) adapted to facilitate concatenated shipping documentation processing spawning intelligent generation subprocesses, utilizing a documentation queue, according to concepts of the present invention. Shipping management system 111 of system 100 may be operable to provide various functionality associated with the processing and shipment of various items. Shipping management system 111 of embodiments may, for example, provide functionality for the processing and shipment of various items by a merchant or other shipper to a purchaser or other recipient as well as for the processing and return shipment of such items by the purchaser or other recipient to the merchant or other original shipper. Such functionality provided according to embodiments of shipping management system 111 includes functionality for processing orders, initiating generation of shipping documentation (e.g., shipping labels, postage indicia, manifests, etc.) therefore, printing generated shipping documentation, and/or the like. Additionally, embodiments of shipping management system 111 may provide functionality for the automation of tasks associated with the shipment of items, including the management of item orders, managing the picking and packing of items for order fulfilment, generation of invoices, and/or tracking of shipment of items through a shipping service provider. For example, shipping management system 111 may comprise some or all of the functionality of a shipping management system, such as the shipping management systems shown and described in the above referenced application entitled "SYSTEMS AND METHODS FOR CLOUD-BASED APPLICATION ACCESS TO RESOURCE" and/or the SHIPSTATION shipping management system provided by Auctane LLC of Austin Tex., adapted to further provide for shipping documentation processing spawning intelligent generation subprocesses according to the concepts herein. Embodiments of shipping management system 111 provide a multi-carrier shipping management system capable of providing shipping functionality (e.g., rating, shipping indicia generation, packing list printing, shipping label printing, tracking, carrier pickup request, manifest printing, account management and payment, etc.) for a plurality of shipping service providers (e.g., the United States Postal Service (USPS), United Parcel Service (UPS), Federal Express, DHL, local couriers, etc.).

The illustrated embodiment shows a cloud-based implementation of shipping management system 111. For example, shipping management system 111 may comprise a cloud-based deployment of a multiuser application which is stored and executed by computing equipment disposed in the "cloud" of network 110. Accordingly, system 100 of the illustrated embodiment includes network 110 in which shipping management system 111 is present. Shipping management system 111 may, for example, comprise a system providing various desired functionality such as in the form of software as a service (SaaS), infrastructure as a service (IaaS), platform as a service (PaaS), unified communications as a service (UCaaS), etc.

It should be appreciated that although a cloud-based application environment is shown in the embodiment of FIG. 1, embodiments of the present invention may be implemented using additional or alternative configurations, such as using one or more locally disposed applications, using a distributed application topology, etc. Similarly, it should be appreciated that the "cloud" environment associated with network 110 may comprise applications, systems (e.g., postage system 112, shipping service provider system 113, and commerce system 114), devices, etc. (e.g., storage 115) in addition to shipping management system 111, one or more of which may be utilized by or otherwise operable with shipping management system 111 for providing functionality as described herein.

Shipping management system 111 may comprise computer executable code executing on one or more processor-based systems (e.g., web servers) deployed in network 110. Network 110 of the illustrated embodiment provides communication links facilitating the communication between various systems and components of system 100, such as user devices 120A-120D and shipping management system 111. Accordingly, network 110 may comprise any number of network configurations, such as the Internet, an intranet, the public switched telephone network (PSTN), a local area network (LAN), a metropolitan area network (MAN), a wide area network (WAN), a cellular network, a wireless network, a cable transmission network, and/or the like. The communication links between the user devices and the other nodes of system 100 (e.g., shipping management system 111, postage system 112, shipping service provider system 113, commerce system 114, computing resources 130A-130D, and other ones of user devices 120A-120D) may comprise wired links (e.g., as illustrated for user devices 120A and 120B) or wireless links (e.g., as illustrated for user devices 120C and 120D), as well as combinations thereof. One or more interfaces, such as may comprise appropriate application programming interfaces (APIs), may be included in or otherwise provided with respect to shipping management system 111 to provide data exchange and/or other functionality described herein between shipping management system 111 and other applications, systems, devices, etc. of system 100 (e.g., postage system 112, shipping service provider system 113, commerce system 114, and/or user devices 120A-120D).

Postage system 112 may comprise one or more processor-based systems (e.g., web servers) operable to provide prepaid postage account and postage indicia generation services (e.g., to generate postage indicia, shipping labels, etc. acceptable by the USPS and/or other shipping service providers). For example, postage system 112 may comprise one or more server of the online postage service offered by Stamps.com Inc. Various individuals (shippers, purchasers, etc.) and/or other entities (e.g., business entities, merchants, etc.) may maintain an account with respect to postage system 112 facilitating the generation of postage indicia, whether individually, in batch, in combination with other documentation (e.g., shipping labels, bills of lading, manifests, customs documents, etc.), and whether directly by the account holder or indirectly, such by operation of shipping management system 111. Prepaid value associated with such accounts may be stored by, or in association with, postage system 112, such as within a postage security device (PSD). Additional or alternative information may be stored by, or in association with, postage system 112, such as user credentials utilized in validating users for account access, usage logs for accounting and/or fraud prevention/detection, rating information for use in shipping service rate determinations, etc.

Shipping service provider system 113 may comprise one or more processor-based systems (e.g., web servers) operable to provide functionality with respect to shipping services provided by a shipping service provider. For example, shipping service provider system 113 may comprise one or more server associated with the USPS providing an interface for accessing various functions and data (e.g., rating tables, shipment tracking functionality and/or data, etc.) with respect to shipments made via USPS provided shipping services. Various individuals (shippers, intended recipients, etc.) and/or other entities (e.g., businesses, merchants, etc.) may utilize such functionality and/or data in association with shipment of items as managed by shipping management system 111.

Commerce system 114 may comprise one or more processor-based systems (e.g., web servers) operable to provide functionality with respect to the sale and purchase of items for which shipping services are ultimately to be provided by a shipping service provider and managed by operation of shipping management system 111. For example, commerce system 114 may comprise one or more server operable to provide online electronic commerce sites (e.g., online merchant stores), electronic marketplaces (e.g., eBay and Amazon Marketplace), etc. Multiple such commerce sites may be in communication with a shipping management system configuration of embodiments, thereby providing a multi-channel shipping management platform. In operation, commerce system 114 of embodiments provides order information (e.g., item purchase information, buyer information, shipping destination information, shipping service information, payment information of one or more marketplaces, such as Amazon.com, eBay, etc., for facilitating shipping management functionality (e.g., shipping management control, reporting, and other operations) of the shipping management system.

Functionality in addition to or in the alternative to the aforementioned postage generation services provided by postage system 112, the aforementioned functionality and/or data provided by shipping service provider system 113, and the aforementioned commerce functionality and/or data provided by commerce system 114 may be provided by these and/or one or more other systems of system 100 (not shown), according to embodiments. For example, functionality may be provided by one or more servers (e.g., manufacturers' systems, distributors' systems, product database systems, etc.) to provide information relevant to shipping various items (e.g., weight information used to determine shipping service rates, item content information used to determine shipping services available for use with respect to particular items, such as in the case of hazardous materials, package size information used to determine shipping service rates and/or compatibility with respect to particular items, etc.). It should be appreciated that the functionality provided by various servers and/or other systems of the cloud environment of system 100 of embodiments is not limited functionality directly related to the management of the shipment of items.

Storage 115 shown in the illustrated embodiment disposed in the cloud environment of network 110 may, for example, comprise various forms of tangible, non-transitory computer readable media. For example, storage 115 of embodiments may comprise random access memory (RAM), read only memory (ROM), flash memory, disk memory, magnetic memory, optical memory, etc. Storage 115 may comprise a storage array or other storage system, such as a redundant array of independent disks (RAID) array, a storage area network (SAN), a network attached storage (NAS) array, and/or the like. Such computer readable storage may be utilized to store various information, including program code of shipping management system 111, program code of client applications utilized with respect to shipping management system 111, postage system 112, shipping service provider system 113, and/or commerce system 114, data utilized by and/or with any or all of shipping management system 111, postage system 112, shipping service provider 113, commerce system 114, and their client applications, etc. Portions of storage 115 may comprise a part of one or more systems of the cloud (e.g., shipping management system 111, postage system 112, shipping service provider system 113, and/or commerce system 114) and/or may be separate from such systems (e.g., provided as an independent database system).

User devices 120A-120D of embodiments comprise processor-based systems operable under control of one or more instruction set (e.g., software, firmware, applet, etc.) adapted to cooperate with shipping management system 111 to provide desired functionality, such as the aforementioned exemplary shipping management functionality. For example, user devices 120A-120D may comprise servers and/or terminals in the form of one or more computer, workstation, kiosk terminal, portable processor-based device, personal digital assistant (PDA), smartphone, etc. Such processor-based systems may comprise a central processing unit (CPU) (e.g., a processor from the PENTIUM or CORE line of processors available from Intel Corporation), memory (e.g., RAM, ROM, flash memory, disk memory, optical memory, etc.) storing the aforementioned one or more instruction set and/or other data used herein, and appropriate input/output circuitry and devices (e.g., network interface card (NIC), keyboard, digital pointer, display screen, peripheral interface, microphone, speaker, wireless interface, etc.). It should be appreciated that, although the illustrated embodiment shows a representative example of the number and configuration of user devices as may be utilized with respect to system 100, the concepts of the present invention are not limited to application to the particular number or configuration of user devices shown.

User devices 120A and 120B of the illustrated embodiment comprise computer systems having a processor, memory, and input/output to enable interaction with shipping management system 111 for providing at least some portion of functionality available through operation of system 100. User device 120A may, for example, be configured for use by a merchant or other shipper to operate with commerce system 114 to offer items for sale and/or with shipping management system 111 for managing orders of such items, outbound shipments of the items of such orders, and return of items by purchasers or other recipients thereof, possibly also operating with postage system 112 and/or shipping service provider system 113 for certain functionality provided thereby. Accordingly, the illustrated embodiment of user device 120A includes a number of computing resources 130A, 130C, and 130D, as may be utilized in facilitating such functionality. Correspondingly, user device 120B may, for example, be configured for use by a purchaser or other acquirer/recipient of an item to operate with commerce system 114 to purchase items and/or with shipping management system 111 for requesting and processing return shipment of various purchased or otherwise acquired items. Accordingly, the illustrated embodiment of user device 120B includes computing resource 130B, as may be utilized in facilitating such functionality.

User device 120C of the illustrated embodiment comprises a tablet device having a processor, memory, and input/output to enable interaction with shipping management system 111 and/or commerce system 114 for providing at least some portion of functionality available through operation of system 100, possibly also operating with postage system 112 and/or shipping service provider system 113 for certain functionality provided thereby. User device 120D of the illustrated embodiment comprises a smartphone having a processor, memory, and input/output to enable interaction with shipping management system 111 and/or commerce system 114 for providing at least some portion of functionality available through operation of system 100, possibly also operating with postage system 112 and/or shipping service provider system 113 for certain functionality provided thereby. Such user device configurations may be particularly well suited for use by purchasers or other recipients of items herein. Of course, such user devices may be utilized by a merchant or other shipper to provide some functionality as described herein.

Irrespective of the particular configuration of the user device, user devices 120 (e.g., user devices 120A-120D) of system 100 of embodiments comprise one or more client applications, such as for interacting with shipping management system 111 to provide operation as described herein. For example, user devices 120 may comprise a user interface client application operable to facilitate user interaction with shipping management system 111. Such user interface client applications may comprise a web browser (e.g., INTERNET EXPLORER, GOOGLE CHROME, or FIREFOX) hosting a client applet associated with shipping management system 111 and operable within the web browser. Thus, a user may interact with shipping management system 111 via a client applet executing within a user interface client application. Additionally or alternatively, user devices 120 may comprise one or more other applications for facilitating operation as described herein. For example, user devices 120 may comprise a mail client (e.g., OUTLOOK, POSTBOX, etc.), a short message service (SMS) client, a social media client (e.g., FACEBOOK, TWITTER, etc.), and/or the like for receiving messages relevant to operations herein. For example, messages delivered using such client applications may comprise notifications regarding shipping documentation generation, notifications regarding resource status (e.g., prepaid postage balance, insufficient postage balance, etc.), shipment notifications, return authorizations, tracking status reports, etc. The messages may include active components operable to cause the user device to interact with functionality of other systems, such as shipping management system 111, postage system 112, shipping service provider system 113, etc., such as to request information, initiate a prepaid balance transaction, etc.

As illustrated with respect to user devices 120A and 120B, various peripherals and other computing resources useful in providing functionality available through operation of system 100 may be coupled to or otherwise in communication with user devices, or other nodes of system 100, of embodiments. For example, computing resources, such as one or more printer (e.g., thermal printer, ink printer, laser printer, etc.), imaging device (e.g., optical scanner, barcode scanner, handheld scanner, camera, biometric sample scanner, etc.), scale (e.g., electronic scale, digital scale), memory device (e.g., optical disk drive, hard disk drive, solid state disk drive, etc.), and/or the like, may be provided for use with any or all of the foregoing processor-based systems according to embodiments herein. Computing resources 130A and 130B, shown in the illustrated embodiment as printers (e.g., printer for printing proof of payment indicia, bills of lading, manifests, receipts, shipping labels, etc.) are shown as being coupled to user devices 120A and 120B, respectively. Similarly, computing resource 130C, shown as a scale (e.g., an electronic scale for weighing items for shipping), and computing resource 130D, shown as an imaging device (e.g., a scanner for obtaining images of shipping items, for scanning barcodes, for scanning addresses or other shipping item information, etc.), are shown as being coupled to user device 120A of the illustrated embodiment. Of course, configurations and deployments of computing resources different than that shown may be utilized according to embodiments of the invention.

Figure 2A:
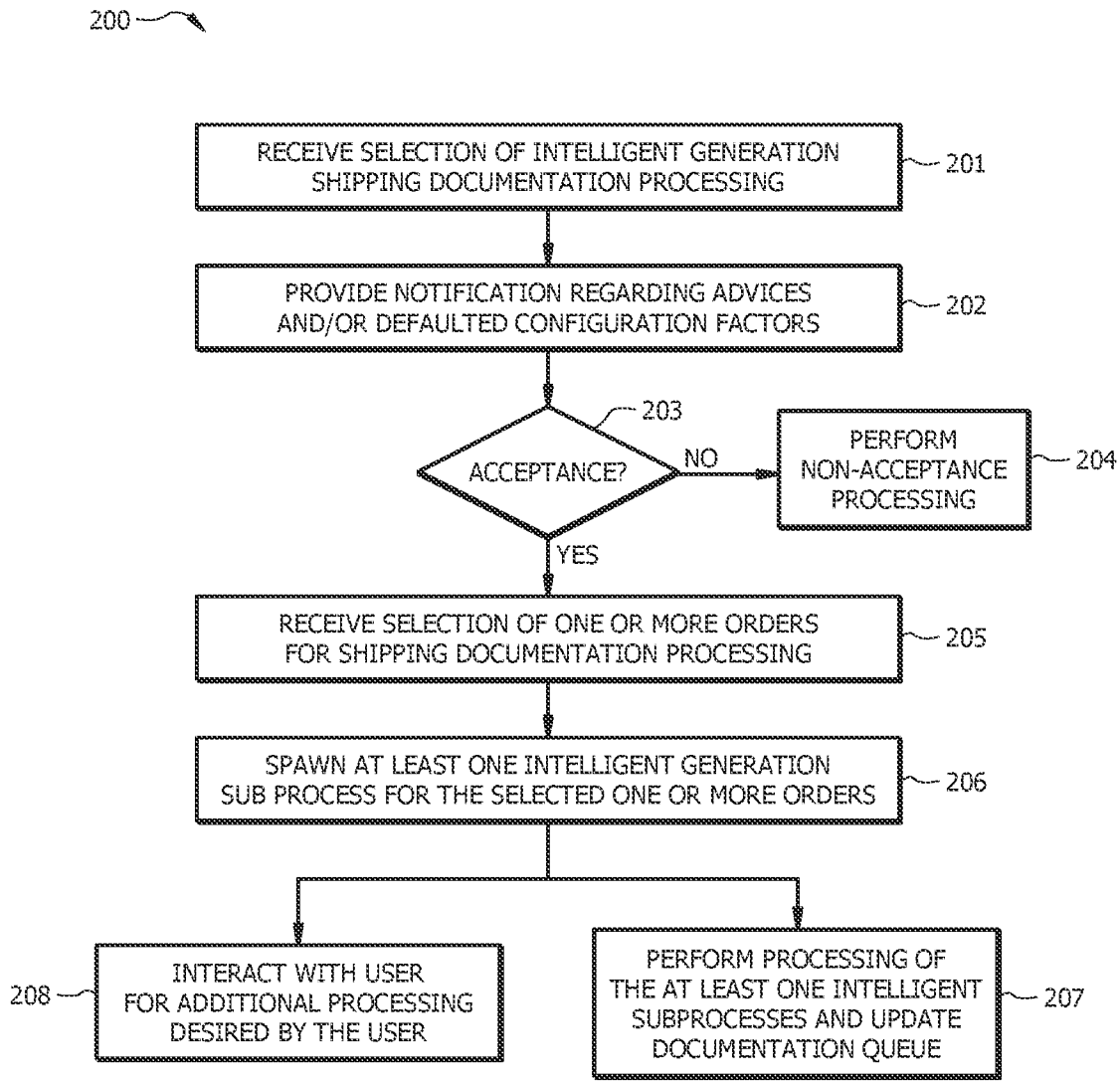
FIG. 2A shows a flow diagram illustrating operation to provide concatenated shipping documentation processing spawning intelligent generation subprocesses in accordance with embodiments of the invention.
Figure 2B:
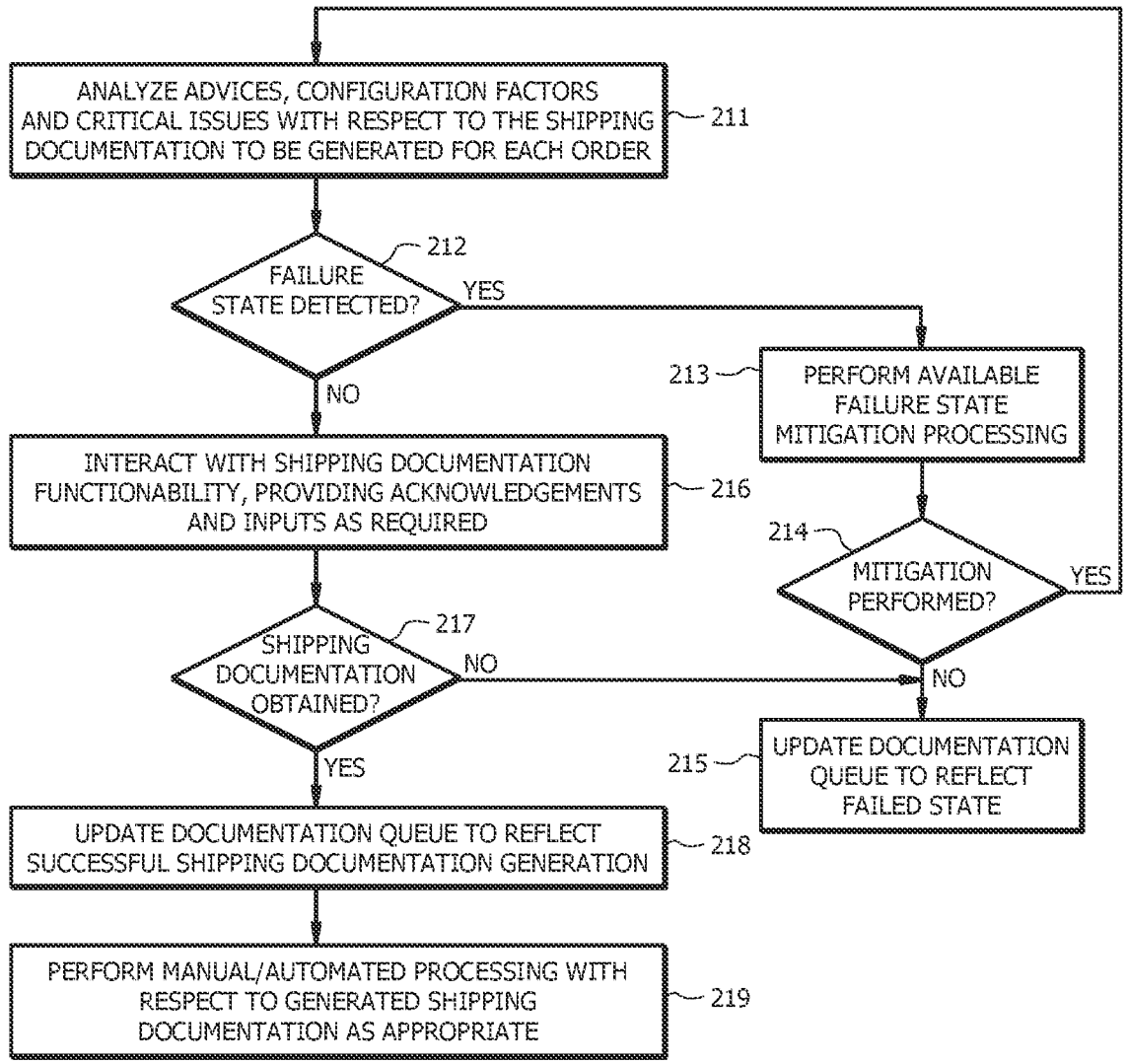
FIG. 2B shows a flow diagram illustrating operation of an intelligent generation subprocess of embodiments to intelligently and autonomously generate appropriate shipping documentation according to embodiments of the invention.

Operation according to embodiments of shipping management system 111 to provide shipping documentation processing spawning intelligent generation subprocesses according to embodiments of the invention is shown the flow diagram of FIGS. 2A and 2B. In particular, FIG. 2A shows flow 200 illustrating operation of shipping management system 111 to provide concatenated shipping documentation processing spawning intelligent generation subprocesses in accordance with embodiments of the invention. FIG. 2B shows flow 207 illustrating operation of an intelligent generation subprocess of embodiments to intelligently and autonomously generate appropriate shipping documentation. The foregoing flows cooperate to provide shipping management system shipping documentation generation operation whereby a user is enabled to select one or more order for shipping documentation generation and initiate a create shipping documentation process, whereby the shipping documentation is generated in the background under control of an intelligent generation subprocess while the user is able to continue working in the shipping management system. Thereafter, when the shipping documentation is ready, it can be accessed via the documentation queue or the user can elect to have the shipping documentation print automatically, according to embodiments of the invention. Operation in accordance with these exemplary flows is described in further detail below.

At block 201 of the illustrated embodiment of flow 200, a user's selection to employ the intelligent generation shipping document processing is received. For example, a user may manipulate a control input, such as "QUICKSHIP™" control 301 of FIG. 3A, to place the shipping management system in a shipping documentation processing mode operable to spawn intelligent generation subprocesses for generating shipping documentation in accordance with embodiments of the invention. The shipping documentation generated according to embodiments of the invention may, for example, comprise shipping labels used in shipping items for one or more orders placed to a shipper. Such shipping labels may comprise various features, such value bearing postage indicia, machine readable information (e.g., in the form of barcodes, graphic tags, etc.), cryptographic aspects (e.g., digitally signed information), etc., in addition to or in the alternative to more traditional shipping label information, such as origination address, destination address, shipper account information, shipping service information, tracking information, and the like. The shipping documentation generated according to embodiments herein may comprise documentation in addition to or in the alternative to the aforementioned shipping labels, such as manifests, bills of lading, way bills, transmittals, etc.

Having elected to initiate the shipping documentation processing mode operable to spawn intelligent generation subprocesses, the user may be provided with notifications regarding advices and/or defaulted configuration factors at block 202 of the illustrated embodiment. In operation of an intelligent generation subprocess of embodiments, presenting one or more verifications, checks, warnings, and/or the like (collectively referred to as advices) typically implemented in shipping documentation generation processing by the shipping management system are suspended. For example, when operating in a standard shipping documentation generation mode, a user may be provided with various warnings, such as a warning that shipping documentation for a selected order has already been generated, that data required or preferred in generating shipping documentation is not present with respect to a selected order, that a prepaid balance for a shipping service provider selected with respect to a selected order is below a threshold, etc. Additionally or alternatively, when operating in the standard shipping documentation mode, the user may be provided with various verifications, such as to present rate details to the user for confirmation prior to generating the shipping documentation, to present a shipping documentation preview to the user for confirmation prior to printing the shipping documentation, etc. Further, one or more parameter, input, selection, and/or the like (collectively referred to as configuration factors) typically solicited in shipping documentation generation processing by the shipping management system are defaulted. For example, when operating in a standard shipping documentation mode, the user may be provided with the opportunity to input various parameters, such as shipping documentation size and/or format parameters, shipping date information, etc. Additionally or alternatively, when operating in the standard shipping documentation mode, the user may be provided with the opportunity to make one or more selections, such as to select a particular printer or other peripheral device to be used with respect to the shipping documentation, to select a particular shipping account for payment for shipping services and/or the shipping documentation itself, etc. However, the intelligent generation subprocess of embodiments operates without one or more of the aforementioned advices and using one or more defaulted configuration factors to intelligently and autonomously generate appropriate shipping documentation in the background. That is, some or all such advices may be suspended and/or some or all such configuration factors may be defaulted in intelligent generation subprocess operation according to embodiments. Thus, appropriate notifications regarding the suspension of advices and the inability to provide configuration factors with respect to the shipping documentation processing operable to spawn intelligent generation subprocesses may be provided at block 202.

Figure 3B:
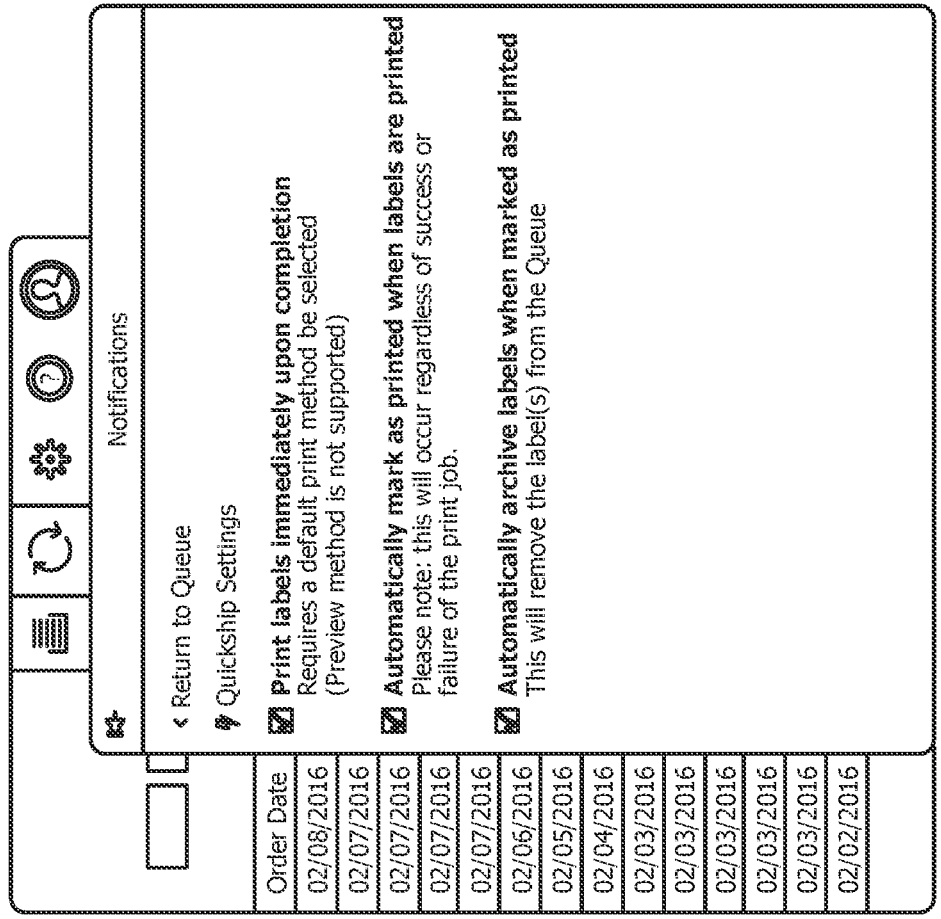
FIG. 3B shows a user interface for selecting operations to be performed with respect to intelligent generation subprocesses of embodiments of the invention.
Figure 3A:
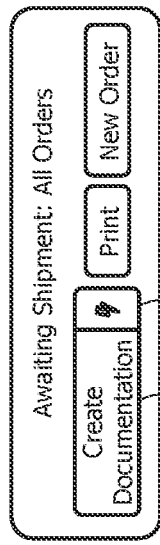
FIG. 3A shows a control input to place a shipping management system in a shipping documentation processing mode operable to spawn intelligent generation subprocesses for generating shipping documentation in accordance with embodiments of the invention.

Embodiments of the invention may additionally or alternatively enable the user to select settings or otherwise input parameters utilized with respect to the shipping documentation processing operable to spawn intelligent generation subprocesses. A user may be provided with the ability to select operations to be performed by the subprocesses, to be performed at spawning and/or conclusion of the subprocesses, etc. according to embodiments herein. For example, as illustrated in FIG. 3B, the user may be enabled to select such operations as printing the shipping documentation upon their generation (i.e., without further user interaction to control printing of shipping documentation), to update state information in the shipping management system (e.g., to mark appropriate orders as having been processed for shipping, to mark shipping documentation as having been printed, etc.), to control entries within the documentation queue (e.g., to archive entries with respect to shipping documentation that has been printed, to highlight or otherwise demarcate entries in need of attention, etc.), and/or the like. Additionally or alternatively the user may be enabled to input settings to select or otherwise control one or more defaulted configuration factors. For example, the user may select or input data, such as shipment method, shipping service provider, shipment date, rating information, additional services, etc. Additionally or alternatively, some or all such defaulted configuration factors may be set without user selection or input, such as to select the current data for the shipment date. Such settings or other parameters may be applied with respect to all shipping documentation generation subprocess instances (e.g., until the defaulted configuration factors are otherwise changed).

At block 203 of the illustrated embodiment a determination is made as to whether the user has accepted the notification regarding defaulted configuration factors and/or adequately inputted any information (e.g., defaulted configuration factor selections or other parameters) for enabling intelligent generation subprocess operation according to embodiments herein. For example, a user may not be aware of, or desirous of, the suspension of advices and may thus decline acceptance of operation of shipping documentation processing spawning intelligent generation subprocesses (e.g., the user may wish to review rate details or be warned regarding certain conditions prior to generation of shipping documentation). Similarly, the user not wish to use a defaulted configuration factor with respect to one or more shipping document to be generated and may thus decline acceptance of operation of shipping documentation processing spawning intelligent generation subprocesses. In operation according to the illustrated embodiment, if the user declines acceptance of operation of shipping documentation processing spawning intelligent generation subprocesses, processing proceeds to block 204 wherein standard shipping documentation generation mode operation is provided. However, if the user accepts operation of shipping documentation processing spawning intelligent generation subprocesses, processing according to the illustrated embodiment proceeds to block 205.

Figure 3C:
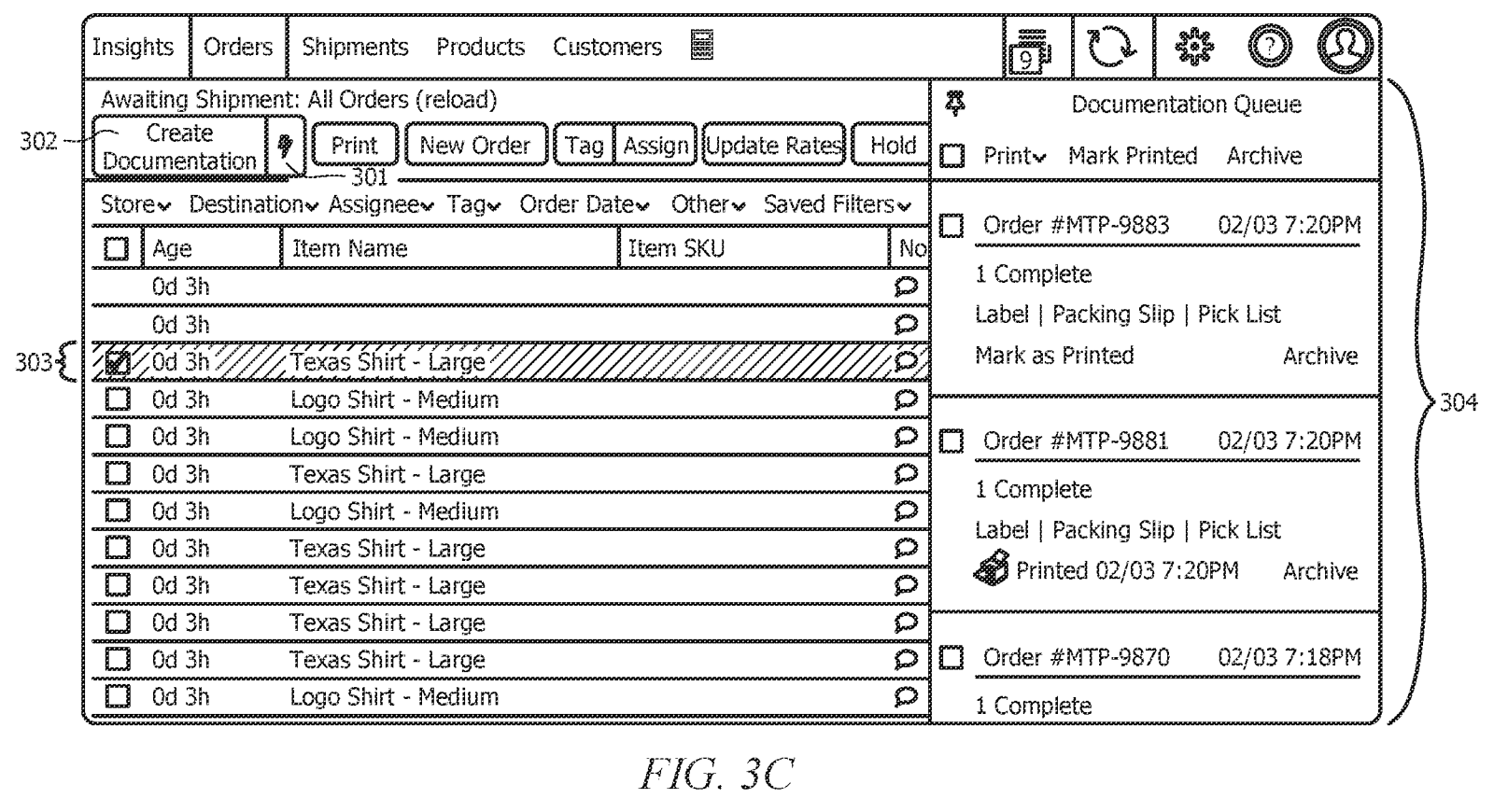

At block 205 of the illustrated embodiment, selections of one or more orders for shipping documentation processing are received. For example, as shown in FIG. 3C, the shipping management system may provide an interface presenting various orders (e.g., orders awaiting shipment), whereby the user may select one or more such orders (e.g., order 303) for shipping documentation processing spawning intelligent generation subprocesses according to embodiments herein. Operation for shipping documentation processing may be initiated for the selected one or more orders in response to the user manipulating a control interface, such as by selection of "create documentation" control 302.

Initiation of shipping documentation processing according to embodiments operates to spawn one or more intelligent generation subprocesses in accordance with the concepts herein at block 206. Thereafter, the one or more intelligent generation subprocesses perform operations for generating shipping documentation with respect to shipment processing of the selected one or more selected order at block 207.

Because operation of the one or more intelligent generation subprocesses are autonomous according to embodiments herein, the user may be freed to perform one or more independent operation and/or interaction with the shipping management system during the shipping document processing, at block 208. For example, one or more other processes of the shipping management system (e.g., shipping documentation generation processing for another order) may be performed in response to independent user interaction with the shipping management system in parallel to shipping documentation generation processing performed by the one or more intelligent generation subprocesses.

In adapting a shipping management system for use of intelligent generation subprocesses, embodiments of the invention implement a documentation queue, such as through storing relevant data in storage 115 and presenting some or all such queue data in a documentation queue user interface of shipping management system 111. Documentation queues of embodiments of the invention provide a history with respect to shipping documentation generation using intelligent generation subprocesses. Additionally or alternatively, documentation queues provide a visual aid for organizing the generated shipping documentation and/or information associated therewith. In operation of embodiments, a documentation queue is accessible throughout the shipping management system user interface to facilitate the user's ability to perform other operations within the shipping management system and nevertheless remain apprised of the shipping documentation generation and/or to facilitate the user's access to generated shipping documentation.

An exemplary documentation queue user interface of shipping management system 111 for a documentation queue implemented according to embodiments herein is shown as documentation queue 304 in FIG. 3C. The documentation queue of embodiments provides historical information with respect to intelligent generation subprocess operation. For example, a documentation queue may operate to provide a running history of the operation of each active intelligent generation subprocess. Accordingly, an entry may be made in the documentation queue upon spawning an intelligent generation subprocess (e.g., at block 206 of flow 200) to indicate that the subprocess has been initiated. Such an entry may be updated at particular milestones (e.g., when connection with a shipping service provider has been made, when shipping documentation generation has been started, when shipping documentation generation is progressing, when generated shipping documentation has been downloaded, when generated shipping documentation has been printed, when shipping documentation generation processing has completed, etc.). Shipping documentation queue 304 illustrated in FIG. 3C shows queue entries with respect to 3 intelligent generation subprocesses, wherein the state is designated as "complete" (i.e., all processing to be performed by those particular intelligent generation subprocesses has concluded, whether successfully or otherwise).

Using a documentation queue of embodiments, despite the user being free to perform one or more independent operation and/or interaction with the shipping management system during the shipping documentation processing, the user may nevertheless be apprised of the documentation generation processing operations initiated by the user. Accordingly, embodiments operate to display the documentation queue user interface (e.g., documentation queue 304) persistently in the shipping management system user interface. For example, a documentation queue user interface may remain displayed in the shipping management system user interface so long as an intelligent generation subprocess is executing (e.g., until all spawned instances of intelligent generation subprocesses have terminated), until all intelligent generation subprocess instances represented in the documentation queue have been archived, until all shipping documentation generated by intelligent generation subprocesses has been printed or otherwise consumed, until all instances of intelligent generation subprocesses have been archived or otherwise removed from the documentation queue, until an intelligent generation shipping processing mode of the shipping management system is exited, until a user selects closing of the documentation queue user interface, and/or the like. Thus, the documentation queue may remain displayed in the shipping management system user interface throughout the user interacting with the shipping management system during the shipping documentation processing to facilitate the user being apprised of the documentation generation processing operations.

As discussed above, a user may select more than one order for initiating shipping documentation generation using intelligent generation subprocesses of embodiments herein. In operation, an intelligent generation subprocess may be spawned for each such selected order to thereby provide separate autonomous shipping documentation generation in association with each of the selected orders. Embodiments of the invention, however, operate to spawn an intelligent generation subprocess that generates shipping documentation for a plurality of selected orders. For example, such intelligent generation subprocesses may operate to "stich" together multiple generated shipping documents (e.g., to form one large PDF file containing multiple shipping labels) for easy organization, for use in keeping shipping documentation having a common attribute (e.g., same shipping origin, same shipping destination, same shipping service provider, orders including the same items, etc.) together, etc. An exemplary documentation queue showing entries associated with operation of intelligent generation subprocesses that generate shipping documents for a plurality of selected orders according to embodiments herein is shown in FIG. 3D.

Processing of shipping documentation with respect to a plurality of orders by an intelligent generation subprocess may be adapted to facilitate efficient or expedited processing. Such embodiments may, for example, leverage functionality of external systems (e.g., one or more of aforementioned postage system 112, shipping service provider system 113, and commerce system 114) to perform shipping documentation generation processing for multiple orders while minimizing certain interactions and/or communications, such as handshaking protocols, serial requests and acknowledgments, etc. As a specific example, an intelligent generation subprocess may include an API or other control interface adapted to interact with a postage indicia generation platform (e.g., postage system 112), such as those shown and described in the above referenced application entitled "SINGLE SECURE ENVIRONMENT SESSION GENERATING MULTIPLE INDICIA," providing for generation of multiple value bearing indicia in a single secure vault session. In such an embodiment not only are the serial communications between the shipping management system and the postal system for multiple shipping documents consolidated into a single request, but further expediting of the shipping documentation generation processing is provided through loading of a secure vault configuration for generating multiple value bearing indicia (as opposed to the traditional loading/unloading of a secure vault configuration for each postage indicia generated).

Detail with respect to operation of an intelligent generation subprocess of embodiments to intelligently and autonomously generate appropriate shipping documentation at block 207 of FIG. 2A is shown in FIG. 2B. At block 211 of the illustrated embodiment of flow 207, logic of the intelligent generation subprocess analyzes advices, configuration factors, and/or critical issues with respect to the one or more selected orders and the respective shipping documentation to be generated. For example, although provision of advices to the user with respect to the shipping documentation to be generated may be suspended, logic of the intelligent generation subprocess may nevertheless analyze one or more advices to determine if advices of a nature (e.g., that data required for generating shipping documentation is not present with respect to a selected order, that a prepaid balance for a shipping service provider selected with respect to a selected order is insufficient to generate the shipping documentation, etc.) indicating that autonomous shipping documentation processing should not be or cannot be performed are present (e.g., that one or more advise is indicative of a critical issue in the then present scenario). Additionally or alternatively, although solicitation of certain selections regarding the shipping documentation generation may be replaced by the use of defaulted configuration factors, logic of the intelligent generation subprocess may analyze configuration factors associated with the generation of the shipping documentation to determine if parameters for the generation of the shipping documentation are missing or are otherwise incompatible with generation of shipping documentation (e.g. a particular shipping account for payment for shipping services and/or the shipping documentation itself is not indicated or set as a default) indicating that autonomous shipping documentation processing should not be or cannot be performed (e.g., that one or more missing or otherwise incompatible configuration factors is indicative of a critical issue in the then present scenario). Such advices and configuration factors, as well as other parameters, may thus be analyzed and determined to present critical issues with respect to the generation of the shipping documentation.

Embodiments of shipping management system 111 may provide integration with inventory management functionality. For example, shipping management system 111 may operate to automatically track and adjust stock in inventory records, such as where a "ship from" field in an order being processed is linked to an inventory source (e.g., warehouse). In operation, the current stock level may be made available with respect to order processing functionality. In addition to tracking the number of items remaining in inventory, such inventory management functionality may provide reservation of inventory items for specific orders (e.g., manually or automatically) by allocating inventory prior to the inventory actually having been depleted. For example, inventory may be allocated to orders to ensure availability of inventory for certain orders, such as orders placed by particularly important customers (e.g., repeat customers, customers having purchased a "membership", etc.), orders placed through certain channels (e.g., reseller marketplaces imposing strict order fulfillment requirements), orders meeting certain criteria (e.g., large orders that cannot be completed without some piece of inventory), and/or the like. Such allocation may be performed based on customizable prioritization rules, for example. The analyzing of advices, configuration factors, and/or critical issues with respect to selected orders at block 211 of embodiments may operate to analyze such inventory data for determining critical issues. For example, if insufficient inventory is available, whether out of stock or allocated for fulfilling another order, logic of an intelligent generation subprocess may determine that a critical issue is present with respect to the generation of the shipping documentation (e.g., shipping documentation is not to be generated for an order that cannot be fulfilled).

The intelligent operation provided by an intelligent generation subprocess of embodiments herein may fail the shipping documentation generation processing where one or more critical issues (e.g., insufficient postage funds, insufficient inventory, incomplete order processing, incompatible defaulted configuration factors, etc.) are detected. Accordingly, at block 212 of the illustrated embodiment a determination is made as to whether a failure state is detected (e.g., a critical issue is present). For example, various advices, configuration factors, and/or other parameters associated with the selected one or more orders and the shipping documentation to be generated therefor may be compared to a database of failure conditions to determine if a failure state is detected. Such comparisons may use single parameters (e.g., insufficient postage funds) meeting corresponding entries within the database as well as multiple parameters meeting corresponding entries in the database (e.g., insufficient postage funds and no alternative prepaid account designated and a postage fund auto-refill function being inactive or inoperable), for example.

If a failure state is detected at block 212 of the illustrated embodiment, processing proceeds to block 213 wherein available failure state processing is performed in order to attempt to mitigate the failure state and facilitate shipping documentation generation. For example, where insufficient postage funds are present for generating the shipping documentation, failure state mitigation processing may operate to initiate a postage fund refill operation, such as through interaction with one or more external platforms providing or facilitating such operation (e.g., postage system 112, shipping service provider system 113, and/or commerce system 114). As another example, where a missing or otherwise incompatible configuration factor is detected, failure state mitigation processing at block 213 of embodiments may operate to analyze historical shipping processing data to select a configuration factor from a prior shipping documentation generation session determined to be a similar scenario, indicative of the user's preference, etc. Additionally or alternatively, failure state mitigation processing may operate to mitigate a failure state through interaction with one or more external systems (e.g., postage system 112, shipping service provider system 113, and/or commerce system 114), such as to obtain data, mitigation processing, etc. therefrom. Thereafter, processing according to the illustrated embodiment proceeds to block 214 where a determination is made as to whether failure state mitigation has been performed (or successfully performed).

If it is determined at block 214 that failure state mitigation processing was not successfully performed, processing according to the illustrated embodiment proceeds to block 215 wherein the state of the intelligent generation subprocess is updated to a failed state and further processing by the intelligent generation subprocess is ended or suspended. It should be appreciated that a documentation queue entry for the intelligent subprocess will be provided in the documentation queue to alert the user of the failure of the intelligent generation subprocess to generate the one or more shipping documents. In operation according to embodiments of the invention, the user may select the documentation queue entry for the intelligent generation subprocess (e.g., at any time convenient to the user, such as after completion of another task being performed within shipping management system 111 by the user) to determine the details of a cause of the failure state and/or to take action to perform failure state mitigation processing. For example, where insufficient postage funds are present for generating the shipping documentation, the user may initiate a postage fund refill operation (e.g., using postage system 112, shipping service provider system 113, and/or commerce system 114). As another example, where a missing or otherwise incompatible configuration factor is detected, the user may input or select one or more configuration factor. Thereafter, processing according to embodiments may operate to re-initiate the intelligent generation subprocess (e.g., returning to block 211) for providing shipping documentation generation processing according to the concepts herein.

If, however, it is determined at block 214 that failure state mitigation processing was successfully performed, processing according to the illustrated embodiment returns to block 211 to analyze advices, configuration factors, and/or critical issues with respect to the one or more selected orders and the respective shipping documentation to be generated in light of the mitigation processing (e.g., to determine if advices of a nature indicating that autonomous shipping documentation processing should not be or cannot be performed are present, to determine if parameters for the generation of the shipping documentation are missing or are otherwise incompatible with generation of shipping documentation indicating that autonomous shipping documentation processing should not be or cannot be performed, to determine if critical issues with respect to the generation of the shipping documentation are present, etc.). Although not expressly shown in the illustrated embodiment, processing to return to block 211 may comprise operation to re-spawn at least one intelligent generation subprocess (e.g., in accordance with block 206 of FIG. 2A) operable to provide functionality with respect to the mitigated failure state.

If no failure state was detected at block 212 of the illustrated embodiment, processing proceeds to block 216 wherein logic of the intelligent generation subprocess interacts with shipping documentation functionality to generate the shipping documentation. For example, the intelligent generation subprocess may interact with one or more systems (e.g., postage system 112, shipping service provider system 113, and commerce system 114, whether through an API or other interface adapted to facilitate operation of intelligent generation subprocesses herein, by providing interaction spoofing or mimicking that of user interaction, and/or the like), preferably providing acknowledgements, inputs, etc., receiving outputs, results, etc., to provide shipping documentation generation processing, or some portion thereof. For example, logic of the intelligent generation subprocess may interact with postage system 112 to generate value bearing postage indicia, postal shipping labels, manifests, etc. to thereby generate the shipping documentation requested by the user or to otherwise facilitate the generation of shipping documentation. Additionally or alternatively, logic of the intelligent generation subprocess may interact with shipping service provider system 113 to generate shipping labels, manifests, item shipment forms, customs forms, etc. to thereby generate the shipping documentation requested by the user or to otherwise facilitate the generation of shipping documentation. Likewise, logic of the intelligent generation subprocess may interact with commerce system 114 to conduct one or more transaction (e.g., payment and purchase for shipping services, value bearing indicia, etc.) for facilitating the generation of shipping documentation.

It should be appreciated that the interaction with shipping documentation functionality to generate the shipping documentation provided by an intelligent generation subprocess need not be with an external system (e.g., postage system 112, shipping service provider system 113, and/or commerce system 114), but may additionally or alternatively be with logic of shipping management system 111 itself. For example, where the shipping documentation comprises a shipping label which does not require value bearing indicia generated by such systems as postage system 112, and where shipping management system 111 comprises sufficient data (e.g., shipping label format information, shipper address, recipient address, etc.) and/or functionality (e.g., barcode generator, facing indication mark generator, etc.) to generate such a shipping label, the intelligent generation subprocess may interact with logic of shipping management system 111 to generate one or more shipping documents according to embodiments of the invention. As another example, an intelligent generation subprocess may interact with an external system (e.g., postage system 112, shipping service provider system 113, and/or commerce system 114) to obtain the benefit of some shipping documentation generation functionality (e.g., generation of postage indicia data, digital value token, shipping service rating, etc.) and utilize functionality internal to shipping management system 111 to generate the shipping documentation (e.g., generate shipping labels having postage indicia thereon rendered from secure data provided by an external system, generate shipping documents having rates determined by an external system, etc.).

Although not expressly shown in the illustrated embodiment, it should be appreciated operation at block 216 of embodiments may include updating the state of the intelligent generation subprocess at one or more milestone in a corresponding instance in the documentation queue of embodiments. For example, the state of the intelligent generation subprocess may be updated to reflect interaction with an external system, initiation of a particular process, completion of a particular process, waiting completion of a process, etc.

At block 217 of the illustrated embodiment, a determination is made as to whether the appropriate shipping documentation was obtained from the interaction with shipping documentation functionality. If the appropriate shipping documentation was not obtained, such as due to a failure to complete the shipping documentation functionality (e.g., resulting from a failure at a remote system or the communication therewith, an undetected critical issue, etc.), processing according to the illustrated embodiment proceeds to block 215 for processing as described above. However, if the appropriate shipping documentation was obtained, processing according to the illustrated embodiment proceeds to block 218.

The state of the intelligent generation subprocess is updated in a corresponding instance in the documentation queue to reflect successful shipping documentation generation at block 218 of embodiments. Thereafter, at block 219, manual and/or automatic processing may be performed with respect to the generated shipping documentation. For example, a user may interact with the instance of the intelligent generation subprocess in the documentation queue at any time convenient to the user (e.g., after completion of another task being performed within shipping management system 111 by the user) to view data regarding the generated shipping documentation, such as to view the shipping documentation, to obtain information regarding shipping rates associated with the shipping documentation, to view/select a printer for printing the generated shipping documentation, etc. Additionally or alternatively, the user may interact with the instance of the intelligent generation subprocess in the documentation queue to take action, such as to print the generated shipping documentation, to archive documentation queue entries for which processing has been completed and the user has no further need for the historical shipping documentation generation information, etc.

It should be appreciated that various actions may be performed automatically by an intelligent generation subprocess and/or by other functionality of the shipping management system, at block 219, after obtaining the generated shipping documentation. For example, where a user has selected to do so, the shipping management system may cause the shipping documentation to be printed to a selected printer. Likewise, where a user has selected to do so, the shipping management system may cause the instance of the intelligent generation subprocess in the documentation queue to automatically be archived (i.e., removed from the documentation queue) after printing of the generated shipping documentation.

Although some embodiments have been described herein with respect to printing generated shipping documentation, it should be appreciated that the concepts of the present invention are not limited to use in scenarios where shipping documentation is printed. For example, embodiments of the present invention may be implemented with respect to third-party fulfillment or drop-shipper scenarios, such as wherein a user transmits shipping instructions (e.g., some or all of the generated shipping documentation) to another party for fulfillment of orders. Accordingly, embodiments facilitate fulfillment of orders whether by self-fulfilling an order (e.g., by generating a shipping label) or by sending a request to a third-party to fulfill the order.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for generating shipping documentation, the system comprising:
    a user interface configured to receive requests to generate shipping documentation;
    one or more application programming interfaces (APIs) configured to communicate with one or more external systems during processing of the requests to generate shipping documentation;
    a memory; and
    one or more processors configured to:
        receive, via the user interface, requests to generate shipping documentation;
        spawn an intelligent generation subprocess to autonomously generate shipping documentation corresponding to each of the requests, wherein notification of one or more shipping management system advices is suspended during generation of the shipping documentation by the intelligent generation subprocess, and wherein the one or more intelligent generation subprocess is configured to:
            communicate with at least one external system of the one or more external systems via the one or more APIs during generation of the shipping documentation;
            determine whether generation of one or more pieces of shipping documents failed;
            initiate failure state mitigation processing in response to detecting generation of one or more pieces of shipping documentation failed, wherein the failure state mitigation processing is configured to autonomously resolve an issue that caused the failure with respect to generation of one or more pieces of shipping documentation; and
            update information presented via the user interface to indicate a status of the intelligent generation subprocess with respect to autonomous generation of the shipping documentation corresponding to each of the requests.

2. The system of claim 1, wherein the one or more processors are configured to spoof user actions during communication with the at least one external system via the one or more APIs.

3. The system of claim 2, wherein the spoofed user actions include providing data to the at least one external system.

4. The system of claim 1, wherein the shipping documentation comprises a packing slip, a manifest, a shipping label, a postage indicium, or a combination thereof.

5. The system of claim 1, wherein the one or more external systems are selected from the list consisting of shipping management systems, postage systems, shipping service provider systems, commerce systems, and user devices.

6. The system of claim 1, wherein the failure state mitigation processing comprises executing a funding operation via communication with the at least one external system via the one or more APIs to fund a postage account maintained by a shipping service provider system, wherein the shipping documentation is generated subsequent to executing the funding operation.

7. The system of claim 1, wherein the failure state mitigation processing comprises analyzing historical shipping processing data to select a configuration factor for a shipment corresponding to a particular request of the requests, wherein the configuration factor is selected from the group consisting of a shipping documentation parameter and a user selection, a shipping documentation format parameter or a shipping date, a printer selection to be used with respect to the shipping documentation, a peripheral device to be used with respect to the shipping documentation, and a shipping account for payment for shipping services associated with the shipping documentation.

8. A method for generating shipping documentation, the method comprising:
    receiving, by one or more processors, requests to generate shipping documentation via inputs provided to a user interface;
    spawning, by the one or more processors, an intelligent generation subprocess to autonomously generate shipping documentation corresponding to each of the requests, wherein notification of one or more shipping management system advices is suspended during generation of the shipping documentation by the intelligent generation subprocess, and wherein the one or more intelligent generation subprocess is configured to:
- communicate with at least one external system of one or more external systems via one or more application programming interfaces (APIs) during processing of the requests to generate shipping documentation;
- determine whether generation of one or more pieces of shipping documents failed;
- initiate failure state mitigation processing in response to detecting generation of one or more pieces of shipping documentation failed, wherein the failure state mitigation processing is configured to autonomously resolve an issue that caused the failure with respect to generation of one or more pieces of shipping documentation; and
- update information presented via the user interface to indicate a status of the intelligent generation subprocess with respect to autonomous generation of the shipping documentation corresponding to each of the requests.

9. The method of claim 8, further comprising spoofing user actions during communication with the at least one external system via the one or more APIs.

10. The method of claim 9, wherein the spoofed user actions include providing data to the at least one external system.

11. The method of claim 8, wherein the shipping documentation comprises a packing slip, a manifest, a shipping label, a postage indicium, or a combination thereof.

12. The method of claim 8, wherein the one or more external systems are selected from the list consisting of shipping management systems, postage systems, shipping service provider systems, commerce systems, and user devices.

13. The method of claim 8, wherein the failure state mitigation processing comprises executing a funding operation via communication with the at least one external system via the one or more APIs to fund a postage account maintained by a shipping service provider system, wherein the shipping documentation is generated subsequent to executing the funding operation.

14. The method of claim 8, wherein the failure state mitigation processing comprises analyzing historical shipping processing data to select a configuration factor for a shipment corresponding to a particular request of the requests, wherein the configuration factor is selected from the group consisting of a shipping documentation parameter and a user selection, a shipping documentation format parameter or a shipping date, a printer selection to be used with respect to the shipping documentation, a peripheral device to be used with respect to the shipping documentation, and a shipping account for payment for shipping services associated with the shipping documentation.

15. The method of claim 8, further comprising, receiving, via the user interface, additional requests to generate additional shipping documentation during autonomous generation of the shipping documentation corresponding to each of the requests.

16. A non-transitory computer-readable storage medium storing instructions that, when executed by one or more processors, cause the one or more processors to perform operations for generating shipping documentation, the operations comprising:
- receiving requests to generate shipping documentation via inputs provided to a user interface;
- spawning an intelligent generation subprocess to autonomously generate shipping documentation corresponding to each of the requests, wherein notification of one or more shipping management system advices is suspended during generation of the shipping documentation by the intelligent generation subprocess, and wherein the one or more intelligent generation subprocess is configured to:
  - communicate with at least one external system of one or more external systems via one or more application programming interfaces (APIs) during processing of the requests to generate shipping documentation;
  - determine whether generation of one or more pieces of shipping documents failed;
  - initiate failure state mitigation processing in response to detecting generation of one or more pieces of shipping documentation failed, wherein the failure state mitigation processing is configured to autonomously resolve an issue that caused the failure with respect to generation of one or more pieces of shipping documentation; and
  - update information presented via the user interface to indicate a status of the intelligent generation subprocess with respect to autonomous generation of the shipping documentation corresponding to each of the requests.

17. The non-transitory computer-readable storage medium of claim 16, further comprising spoofing user actions during communication with the at least one external system via the one or more APIs, wherein the spoofed user actions include providing data to the at least one external system.

18. The non-transitory computer-readable storage medium of claim 16, wherein the shipping documentation comprises a packing slip, a manifest, a shipping label, a postage indicium, or a combination thereof.

19. The non-transitory computer-readable storage medium of claim 16, wherein the one or more external systems are selected from the list consisting of shipping management systems, postage systems, shipping service provider systems, commerce systems, and user devices.

20. The non-transitory computer-readable storage medium of claim 16, wherein the failure state mitigation processing comprises:
- executing a funding operation via communication with the at least one external system via the one or more APIs to fund a postage account maintained by a shipping service provider system, wherein the shipping documentation is generated subsequent to executing the funding operation; or
- analyzing historical shipping processing data to select a configuration factor for a shipment corresponding to a particular request of the requests, wherein the configuration factor is selected from the group consisting of a shipping documentation parameter and a user selection, a shipping documentation format parameter or a shipping date, a printer selection to be used with respect to the shipping documentation, a peripheral device to be used with respect to the shipping documentation, and a shipping account for payment for shipping services associated with the shipping documentation.

* * * * *